United States Patent Office 2,973,343
Patented Feb. 28, 1961

2,973,343
PYRROLIDONE POLYMERIZATION

William O. Ney, Jr., Lincoln Township, Washington County, Minn., assignor to Minnesota Mining and Manufacturing Company, St. Paul, Minn., a corporation of Delaware No Drawing. Filed Mar. 3, 1958, Ser. No. 718,393

6 Claims. (Cl. 260—78)

This invention relates to the polymerization of 2-pyrrolidone and more particularly to a process for polymerization of 2-pyrrolidone in the presence of organic catalysts and the products obtained by this process.

Polymerization of 2-pyrrolidone to form moldable and extrudable polypyrrolidone has been described in U.S. Patent 2,638,463. For this reaction it has been found necessary to use strongly basic inorganic catalysts; and additionally, it has been found advantageous to employ small amounts of various initiators as described in U.S. Patent 2,809,958. By these reactions polypyrrolidone is obtained, from which fibers and films can be formed. However, polymers produced using the strongly basic inorganic catalysts have one disadvantage, in that despite careful washing, they still retain a trace of inorganic ash which seems to decrease the stability of the polymer under some conditions. The metallic ions of the catalyst or certain contaminants are apparently held so closely bound that they appear to form part of the molecular structure and hence are not completely removed even by washing with aqueous mineral acids. The ash from such bound metallic ions is hereinafter referred to as "inorganic retained ash."

It is an object of this invention to provide polypyrrolidone having a low content of inorganic retained ash. A further object is to provide a process for the polymerization of pyrrolidone in the presence of an organic catalyst. Other objects will become evident hereinafter.

It has been found that the above and other objects of this invention are accomplished by polymerizing pyrrolidone in the presence of certain organic bases under substantially anhydrous conditions. The organic bases suitable for the purposes of the invention are quaternary bases which can be represented by the formula

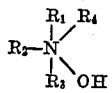

wherein $R_1$, $R_2$ and $R_3$ are members of the group consisting of lower alkyl radicals and $R_4$ is a member of the group consisting of alkyl, aryl and aralkyl radicals. These bases give rise to a quaternary ammonium cation in basic solution (for example, in water or pyrrolidone monomer), which can be represented by the formula

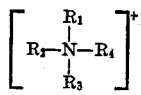

wherein $R_1$, $R_2$, $R_3$ and $R_4$ have the same significance as hereinabove. Suitable organic bases for the purpose of the invention are illustrated by the quaternary ammonium hydroxides such as tetramethyl, tetraethyl, tetra-n-propyl and tetra-n-butyl ammonium hydroxide, as well as benzyl trimethylammonium hydroxide, phenyltrimethylammonium hydroxide and the like. These substances surprisingly are strong enough bases to form salts with pyrrolidone. The resulting organic salts are found to catalyze the polymerization of pyrrolidone at molal concentrations analogous to those required for catalysis by inorganic salts of pyrrolidone; and polypyrrolidone can be prepared in this way which is substantially free from retained ash.

The conditions under which polymerization is carried out in the process of the invention may vary widely. The polymerization mixture may be allowed to stand at ambient temperature or it may be heated at temperatures up to 80° C. Inert solvents can be employed, with agitation, so that dispersions or granular polymers are produced; or, alternatively, the polymer can be produced in the form of a solid block. Acyl activators such as those disclosed in U.S. Patent 2,809,958 can be added in amounts of the order of those shown in that disclosure, although traces of butyrolactone or the like which are commonly present in the pyrrolidone as impurities will function as activators. In any case it is necessary that the reaction mixture be substantially anhydrous; if the quaternary base is added in aqueous solution, water is removed so that polymerization may proceed.

The polypyrrolidone produced by the process of the invention is substantially free from inorganic retained ash and consequently the ash-content is substantially nil if pure starting materials and deionized water have been used.

Accidental contamination of the monomer, polymerization reaction or polymer may have a deleterious effect and is to be avoided as far as possible. However, contamination by dust, inorganic materials and metals cannot possibly be avoided under all conditions and traces of iron and alloying elements are commonly encountered in samples prepared by this method, as well as prior art methods. Likewise, silica may be introduced from glassware, stone bench tops and the like; and silicon is a common innocuous constituent of the ash.

The significant impurities to be avoided are the basic elements particularly the alkali and alkaline earth metals. It has heretofore been impossible to avoid the presence of these elements since they have been the only available catalysts for the polymerization of pyrrolidone. It is to be noted that it is the presence of these basic elements in the inorganic retained ash which is deleterious and is to be avoided; they are not deleterious if not in a retained form. For example, the presence of small amounts of inert salts such as potassium chloride, calcium silicate and the like is not harmful. The addition of such materials may even be deliberate as, for example, when introducing fillers and the like. However, the presence of more than about 0.005 percent by weight of inorganic retained ash of basic elements is harmful to the product polypyrrolidone. The part of the inorganic retained ash as described above which consists of basic elements is conveniently designated the "basic inorganic retained ash." The polymer of this invention containing less than 0.005 percent of basic inorganic retained ash is characterized by its increased stability toward heat as compared with polypyrrolidone produced by the ordinary methods heretofore known to the art.

Broadly speaking, the polymerization process of the invention is carried out by adding to substantially pure pyrrolidone about 0.25 to 10 mole percent of the selected quaternary ammonium hydroxide base, as an aqueous solution. The water is then removed from the mixture, which thereafter can be heated to 25° to 80° C. to bring about polymerization, or, more conveniently, in the absence of an activating impurity in the pyrrolidone, about 0.05 to 5 mol percent of an acyl activator of the type disclosed in U.S. Patent 2,809,958 are added, and the mixture is polymerized as set forth in the said patent.

The polymerized mass is broken up and washed with water, and dried; and is then in condition for use. The retained ash content of polymer prepared using reactants and solvents of low ash content is substantially nil.

The following examples will more specifically illustrate the process of the invention. They are intended to be exemplary rather than limiting, as showing the best mode contemplated for carrying out the invention, and should be so read. In the examples, all parts are by weight unless otherwise specified. Inherent viscosities are determined by standard methods at a concentration of about 0.2 g. of polymer per 100 ml. of metacresol.

*Example 1*

In a vessel equipped for stirring and distillation and fitted with an addition device is placed 215 parts of xylene (mixed isomers boiling 137° to 140° C. as Merck Reagent) and 33 g. of a 10 percent aqueous solution of tetramethylammonium hydroxide. The vessel is heated at about 35° C. under about 18 mm. of mercury pressure to remove water and xylene. There is considerable foaming and it is necessary to add about 300 parts of fresh xylene during the distillation. Distillation is continued until about 430 parts of xylene and substantially all the water is in the distillate. To the residue of tetramethylammonium hydroxide and xylene remaining in the vessel is then added 130 parts of xylene and 100 parts of pyrrolidone purified by distillation at 1 mm. pressure from 2 percent by weight of potassium hydroxide. Foaming ceases and distillation is continued at about 18 mm. Hg pressure, gradually raising the temperature and removing water, xylene and some pyrrolidone until the contents of the vessel are at about 90° C. at which point the mixture comprises an anhydrous pyrrolidone solution of the tetramethylammonium salt of pyrrolidone. The vessel is cooled to about 20–25° C., the vacuum is broken with dry nitrogen and a solution of 0.735 part of actyl-pyrrolidone in 125 parts of heptane is added with agitation. Polymerization commences immediately with the formation of a fine particulate suspension in about 5 minutes and evolution of heat (to about 30° C.). Agitation is continued for one hour and the polymerization is then permitted to proceed for about 18 hours at ambient temperatures. The polymer is recovered by decanting the heptane containing residual xylene and adding the remaining solid reaction mixture to vigorously stirred distilled water and collecting the fine white powdery to granular polypyrrolidone. The moist polypyrrolidone is washed twice with about 200 parts of distilled water and then with about 200 parts of methanol and after being again collected is dried in vacuum at 70° C. The white thermoplastic polymer powder has an inherent viscosity of 2.16 and is moldable and extrudable to form fibers and films. By pressing between platens at about 260° C. a colorless, flexible transparent film is formed. The ash-content of the polymer thus produced is 0.04 percent, none of which is basic inorganic retained ash.

Spectroscopic analysis of the ash of this polymer shows the presence of trace amounts (less than 1 percent each) of B, Mn, Pb, Sn, Fe, Mo, Cu, Ag, Ti, Ni, Cr, Ba, Al, Mg and Na. The calcium content of the ash is between about 1 and 5 percent and the balance (at least 85 percent) is silicon. The total content of the polymer of uncombined basic elements is therefore less than about 0.0025 percent.

Polymer produced by the process of U.S. Patent 2,809,958 and carefully washed with 1 N hydrochloric acid and distilled water is found to have an ash content of about 0.06 percent which is found on spectroscopic analysis to comprise at least 30 percent of basic elements including calcium and potassium.

The stability (thermal molecular weight retention) of the polymer of this example produced with an organic base is shown by heating samples in ceramic boats under high vacuum for 30 minutes at temperatures near or above the melting point and determining the effect of this treatment on the inherent viscosity of the polymer. The results are shown in the following table:

| Temperature (° C.) | Inherent viscosity after 30 minutes | Percent decrease in inherent viscosity |
| --- | --- | --- |
| room (control) | 2.16 | |
| 250° | 1.60 | 26 |
| 260° | 1.34 | 38 |
| 270° | 1.23 | 43 |

Under these test conditions polymer produced using inorganic bases and containing basic inorganic retained ash in excess of 0.005 percent is found to drop more than 50 percent in inherent viscosity in 30 minutes at 250° C.

*Example 2*

The foaming observed during the dehydration of the aqueous tetramethylammonium hydroxide is obviated and the time required is therefore shortened by the following procedure.

A vessel such as used in Example 1 is charged with 215 parts of xylene and 100 parts of pyrrolidone distilled from potassium hydroxide as in Example 1. This is heated to refluxing at 18 mm. pressure and 33 parts of 10 percent aqueous tetramethylammonium hydroxide is added in portions intermittently together with portions of a further amount of 130 parts of xylene so that xylene and water are codistilled continuously. A further amount of 85 parts of xylene is then added and distillation is continued until all of the water (about 30 parts), most of the xylene and a small amount of pyrrolidone have passed into the distillate. Further steps in the polymerization of the residue in the vessel proceed as described in Example 1. After about 18 hours the polymer is precipitated in deionized water, washed twice with methanol and is dried. The polymer closely resembles that of Example 1 as to moldability and other utility. It has an inherent viscosity of 1.99. The ash-content is 0.04 percent which is similar to that of Example 1 as regards basic inorganic retained ash.

*Example 3*

The general procedure of Example 2 is repeated employing 29.2 parts of 40 percent aqueous benzyltrimethylammonium hydroxide and 300 parts of xylene instead of the 430 parts employed in Example 2. Dehydration, cooling to 25° C., addition of the acetyl pyrrolidone in heptane and polymerization otherwise proceed exactly as in Example 2. The washed polypyrrolidone is obtained as a white finely granular material having melting point about 260° C. and inherent viscosity of 2.58. It is likewise moldable and extrudable by the methods employed in Example 1. It has an ash content of 0.02 percent by weight and contains less than 0.005 percent basic inorganic retained ash.

When phenyltrimethylammonium hydroxide is substituted for the benzyltrimethylammonium hydroxide in the process of this example, similar results are obtained.

*Example 4*

The procedure of Example 3 is repeated using tetramethylammonium hydroxide and employing different ratios of base and activator. The variations and results are shown in the following table:

| Run | Parts base (as 10 percent aqueous solution) | Parts of Activator | Inherent viscosity of washed and dried polymer | Yield, percent | Ash content, percent |
| --- | --- | --- | --- | --- | --- |
| A | 16.5 | 0.34 | 3.40 | 63 | 0.03 |
| B | 16.5 | 0.735 | 2.97 | 65 | 0.05 |

Each of these polymers contains less than 0.003 percent of basic inorganic retained ash and is otherwise the equivalent of the polymers of the above examples.

The above examples illustrate the organically catalyzed polymerization of 2-pyrrolidone in suspension in an inert solvent. In these examples heptane is employed, but other inert solvents such as described in U.S. Patent 2,739,959 for the inorganically catalyzed polymerization are also useful for this purpose. This invention is not limited, however, to suspension polymerizations but is equally applicable to bulk polymerizations in which no diluent is employed as shown in the following example.

*Example 5*

A vessel provided with agitator, thermometer and vacuum fractional distillation head is charged with 100 parts of pyrrolidone and 85 parts of xylene. The xylene is then distilled at about 45° C. at 18 mm. of mercury pressure and distillation is continued until the residue reaches a temperature of about 90° C. The pyrrolidone is then anhydrous. The vessel is cooled and dry nitrogen gas is admitted to break the vacuum. To the residue is added 1.47 parts of acetyl pyrrolidone. The resulting activator solution is then ready for mixing with the catalyst solution which is prepared as follows.

A vessel similarly arranged to that above and further provided with device for dropwise addition is charged with 100 parts of pyrrolidone and 215 parts of redistilled xylene. The vessel and contents are heated under 18 mm. of mercury pressure until xylene begins to distill and 29.2 parts of 40 percent aqueous benzyltrimethylammonium hydroxide (available commercially from Rohm and Haas Co. as Triton B) are then added dropwise. The distillation is continued, incrementally adding a further amount of 175 parts of xylene. When the contents of the vessel reach a temperature of about 90° C. at this pressure, all of the water present and most of the xylene are in the distillate. The catalyst solution, an anhydrous solution of benzyltrimethylammonium pyrrolidone in pyrrolidone is then cooled and is ready for use.

A sealable container, previously thoroughly dried under vacuum, is filled with the activator and catalyst solutions prepared above. Polymerization commences almost as soon as the solutions are mixed and proceeds rapidly and somewhat exothermically. The sealed container is stored at room temperature for about 45 hours and the resulting hard polymer mass is removed. If a glass bottle is used it is necessary to break it to remove the hard mass. An open container can also be used if storage is under substantially anhydrous conditions.

The hard mass of polymer is ground to a coarse granular size by means of a Wiley Laboratory Mill. Without further treatment the polymer has an inherent viscosity of 2.28 which is raised to 2.65 by drying for 5 hours at 100° C. under 0.5 mm. of mercury pressure. There is about 20 percent loss of weight on this drying owing to loss of occluded monomer. Washing the comminuted polymer three times with distilled water followed by a methanol wash and vacuum drying furnishes a white thermoplastic polymer having an inherent viscosity of 2.94. This polymer is moldable and extrudable as described in Example 1. The ash content is 0.03 percent. The polymer contains less than 0.005 percent of basic inorganic retained ash.

What is claimed is:

1. The process for the polymerization of 2-pyrrolidone which comprises polymerizing pyrrolidone under substantially anhydrous conditions in the presence of a catalytic amount of a quaternary ammonium base represented by the formula:

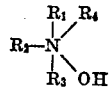

wherein $R_1$, $R_2$ and $R_3$ are members of the group consisting of lower alkyl radicals and $R_4$ is a member of the group consisting of alkyl, aryl and aralkyl radicals.

2. The process which comprises heating 2-pyrrolidone at a temperature in the range of about 25° to 80° C. under substantially anhydrous conditions in the presence of about 0.25 to 10 mole percent of a quaternary ammonium cation, the said cation being represented by the formula:

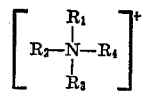

wherein, $R_1$, $R_2$ and $R_3$ are members of the group consisting of lower alkyl radicals and $R_4$ is a member of the group consisting of alkyl, aryl and aralkyl radicals.

3. The process which comprises heating 2-pyrrolidone under substantially anhydrous conditions at a temperature in the range of about 25° C. to 80° C. in the presence of about 0.25 to 10 mole percent of a pyrrolidone salt of a quaternary ammonium base catalyst represented by the formula:

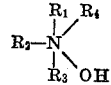

wherein $R_1$, $R_2$ and $R_3$ are members of the group consisting of lower alkyl radicals and $R_4$ is a member of the group consisting of alkyl, aryl and aralkyl radicals, until a significant amount of polypyrrolidone has been produced.

4. The process according to claim 3, in which the catalyst is tetramethylammonium hydroxide.

5. The process according to claim 3, in which the catalyst is benzyltrimethylammonium hydroxide.

6. A process for polymerization of 2-pyrrolidone to form pyrrolidone having less than about 0.005 percent by weight of basic inorganic retained ash, which comprises preparing a substantially anhydrous mixture containing at least about 85 mole percent pyrrolidone and containing about 0.25 to 10 mole percent of a salt of pyrrolidone with a quaternary ammonium hydroxide base represented by the formula:

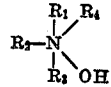

wherein $R_1$, $R_2$ and $R_3$ are members of the group consisting of lower alkyl radicals and $R_4$ is a member of the group consisting of alkyl, aryl and aralkyl radicals and about 0.05 to 5 mole percent of an acyl activator for pyrrolidone polymerization, and maintaining the said mixture at about 25° C. to 80° C.

References Cited in the file of this patent

UNITED STATES PATENTS

| | | |
|---|---|---|
| 2,638,463 | Ney et al. | May 12, 1953 |
| 2,739,959 | Ney et al. | Mar. 27, 1956 |
| 2,806,856 | Robinson | Sept. 17, 1957 |
| 2,809,958 | Barnes et al. | Oct. 15, 1957 |

FOREIGN PATENTS

| | | |
|---|---|---|
| 205,015 | Australia | Jan. 31, 1957 |

UNITED STATES PATENT OFFICE

CERTIFICATE OF CORRECTION

Patent No. 2,973,343                          February 28, 1961

William O. Ney, Jr.

It is hereby certified that error appears in the above numbered patent requiring correction and that the said Letters Patent should read as corrected below.

Column 3, line 38, for "actyl-pyr-" read -- acetyl-pyr- --; column 6, line 44, for "pyrrolidone" read -- polypyrrolidone --.

Signed and sealed this 12th day of September 1961.

(SEAL)
Attest:

ERNEST W. SWIDER                                       DAVID L. LADD
Attesting Officer                                         Commissioner of Patents

USCOMM-DC